(12) United States Patent
Wu

(10) Patent No.: US 8,692,972 B2
(45) Date of Patent: Apr. 8, 2014

(54) STEREOSCOPIC IMAGE PRINTING DEVICE WITH ENHANCED PRINTING EFFICIENCY AND RELATED PRINTING METHOD

(75) Inventor: Wen-Yue Wu, Tainan (TW)

(73) Assignee: Hiti Digital, Inc., New Taipei (TW)

( * ) Notice: Subject to any disclaimer, the term of this patent is extended or adjusted under 35 U.S.C. 154(b) by 600 days.

(21) Appl. No.: 13/053,210

(22) Filed: Mar. 22, 2011

(65) Prior Publication Data

US 2012/0162617 A1    Jun. 28, 2012

(30) Foreign Application Priority Data

Dec. 28, 2010   (TW) .............................. 99146229 A

(51) Int. Cl.
  *G03B 27/32*   (2006.01)
(52) U.S. Cl.
  USPC .............................................. 355/22; 355/77
(58) Field of Classification Search
  USPC .................. 353/7, 9; 359/458, 462, 466, 475; 348/42, 47, 48; 355/22, 77
  See application file for complete search history.

(56) References Cited

U.S. PATENT DOCUMENTS 5,528,420 A    6/1996  Momochi
8,320,041 B2 * 11/2012  Uehara et al. ................. 359/463

FOREIGN PATENT DOCUMENTS

| CN | 1268139 C | 8/2006 |
| EP | 1245120 B1 | 7/2004 |
| TW | 560617 | 11/2003 |

OTHER PUBLICATIONS

English translation of abstract of CN 1268139 (published Aug. 2, 2006).
English translation of abstract of TW 560617 (published Nov. 1, 2003).

* cited by examiner

*Primary Examiner* — Peter B Kim
*Assistant Examiner* — Michelle Iacoletti
(74) *Attorney, Agent, or Firm* — McClure, Qualey & Rodack, LLP

(57) ABSTRACT

A stereoscopic image printing device includes an actuating unit for moving a grating structure, a print head for transferring a plurality of target image data onto corresponding positions of the grating structure, a first detecting module, a second detecting module, and a controller coupled to the print head, a first photosensitive component of the first detecting module, and a second photosensitive component of the second detecting module for controlling the print head to print some of the plurality of target image data onto the grating structure according to comparison between first optical intensity signal generated by the first detecting module and second optical intensity signal generated by the second detecting module.

12 Claims, 5 Drawing Sheets

STEREOSCOPIC IMAGE PRINTING DEVICE WITH ENHANCED PRINTING EFFICIENCY AND RELATED PRINTING METHOD

BACKGROUND OF THE INVENTION

1. Field of the Invention

The present invention relates to a stereoscopic image printing device and a related printing method, and more particularly, to a stereoscopic image printing device with enhanced printing efficiency and a related printing method.

2. Description of the Prior Art

Conventional stereoscopic image printing device is printed with the interlaced pattern on a grating plate for generating stereoscopic image. The grating plate is made of transparent material, and the interlaced pattern is designed according to parameters of the grating plate, such as a width and a density of gratings on the grating plate. A print head is used to transfer the interlaced pattern onto the correct position of the grating plate with a positioning module having positioning function. However, structure of the conventional positioning module is complicated, so that the conventional positioning module is unpopular due to drawbacks of expensive cost, inconvenient operation and huge volume.

SUMMARY OF THE INVENTION

The present invention provides a stereoscopic image printing device with enhanced printing efficiency and a related printing method for solving above drawbacks.

According to the claimed invention, a stereoscopic image printing device includes an actuating unit for moving a grating structure, a print head for transferring a plurality of target image data onto corresponding positions of the grating structure, and a first detecting module. The first detecting module includes a plurality of first shelters disposed on a side of the grating structure, a first planar light source disposed on the other side of the grating structure for emitting light to pass through the grating structure and an interval between the adjacent first shelters, and a first photosensitive component disposed on the side of the grating structure for receiving the light emitted from the first planar light source passing through the grating structure and the interval between the adjacent first shelters so as to generate a corresponding first optical intensity signal. The stereoscopic image printing device further includes a second detecting module. The second detecting module includes a plurality of second shelters disposed on the side of the grating structure, a second planar light source disposed on the other side of the grating structure for emitting light to pass through the grating structure and an interval between the adjacent second shelters, and a second photosensitive component disposed on the side of the grating structure for receiving the light emitted from the second planar light source passing through the grating structure and the interval between the adjacent second shelters so as to generate a corresponding second optical intensity signal. The stereoscopic image printing device further includes a controlling unit coupled to the print head, the first photosensitive component and the second photosensitive component for controlling the print head to transfer a corresponding target image datum of the plurality of target image data onto the grating structure according to comparison of the first optical intensity signal and the second optical intensity signal.

According to the claimed invention, the controlling unit is further for controlling the print head to print a target image datum of two target image data when the first optical intensity signal is greater than the second optical intensity signal, and the controlling unit is further for controlling the print head to print the other target image datum of the two target image data when the first optical intensity signal is smaller than the second optical intensity signal.

According to the claimed invention, the plurality of first shelters is arranged adjacent to the plurality of second shelters in an interlaced manner.

According to the claimed invention, a moving direction of the grating structure is substantially perpendicular to orientations of the plurality of first shelters and the plurality of second shelters.

According to the claimed invention, the first photosensitive component is a single point photosensitive component, and the optical intensity signal generated by the single point photosensitive component substantially conforms to a sine wave signal.

According to the claimed invention, the first detecting module further comprises a first condenser disposed between the plurality of first shelters and the first photosensitive component.

According to the claimed invention, a width of each first shelter is substantially smaller than a grating width of the grating structure.

According to the claimed invention, a distance between the adjacent first shelters is substantially equal to a grating width of the grating structure.

According to the claimed invention, a stereoscopic image printing method includes arranging a plurality of first shelters adjacent to a plurality of second shelters in an interlaced manner, disposing the plurality of first shelters and the plurality of second shelters on a side of a grating structure, moving the grating structure relative to the plurality of first shelters and the plurality of second shelters, a first planar light source emitting light to pass through the grating structure and an interval between the adjacent first shelters, a second planar light source emitting light to pass through the grating structure and an interval between the adjacent second shelters, a first photosensitive component receiving the light emitted from the first planar light source passing through the grating structure and the interval between the adjacent first shelters so as to generate a corresponding first optical intensity signal, a second photosensitive component receiving the light emitted from the second planar light source passing through the grating structure and the interval between the adjacent second shelters so as to generate a corresponding second optical intensity signal, receiving a plurality of target image data, comparing the first optical intensity signal with the second optical intensity signal when moving the grating structure, and transferring a corresponding target image datum of the plurality of target image data onto the grating structure according to comparison of the first optical intensity signal and the second optical intensity signal.

According to the claimed invention, transferring the corresponding target image datum of the plurality of target image data onto the grating structure according to the comparison of the first optical intensity signal and the second optical intensity signal includes transferring a target image datum of two target image data onto the grating structure when the first optical intensity signal is greater than the second optical intensity signal, and transferring the other target image datum of the two target image data onto the grating structure when the first optical intensity signal is smaller than the second optical intensity signal.

According to the claimed invention, moving the grating structure relative to the plurality of first shelters and the plurality of second shelters includes moving the grating structure relative to the plurality of first shelters and the plurality of second shelters along a direction substantially perpendicular to orientations of the plurality of first shelters and the plurality of second shelters.

According to the claimed invention, the stereoscopic image printing method further includes setting correlation of the plurality of target image data and the grating structure.

The stereoscopic image printing device and the related printing method according to the embodiment of the present invention utilizes the single point photosensitive components to respectively receive the light emitted from the planar light sources passing through the grating structure and the plurality of shelters, and the single point photosensitive components generate the optical intensity signals with sine wave when the grating structure moves relative to the plurality of shelters. The controlling unit of the stereoscopic image printing device of the present invention compares difference of the optical intensity signals for controlling the print head to transfer the corresponding target image data onto the corresponding position of the grating structure. Therefore, the positioning module of the present invention has advantages of simple structure, small volume and low cost, and can analyze positioning information immediately and rapidly, so as to enhance the printing efficiency of the stereoscopic image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
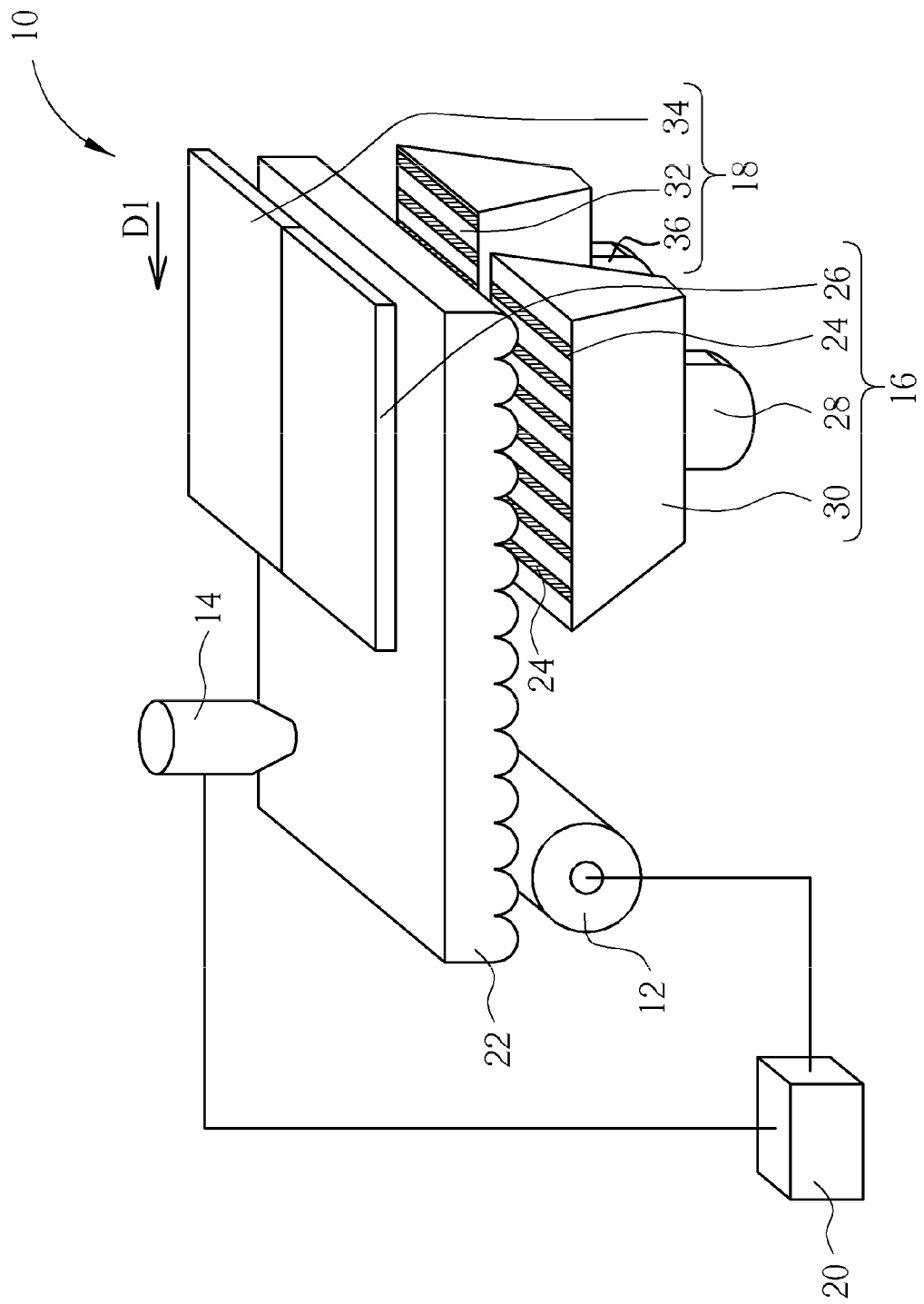
FIG. 1 is a diagram of a stereoscopic image printing device according to an embodiment of the present invention.

Please refer to FIG. 1. FIG. 1 is a diagram of a stereoscopic image printing device 10 according to an embodiment of the present invention. The stereoscopic image printing device 10 includes an actuating unit 12, a print head 14, a first detecting module 16, a second detecting module 18 and a controlling unit 20. The actuating unit 12 is for moving a grating structure 22. The print head 14 is for transferring a plurality of target image data onto corresponding positions of the grating structure 22. The controlling unit 20 is coupled to the print head 14, the first detecting module 16 and the second detecting module 18 for controlling the print head 14 to print a corresponding target image datum of the plurality of target image data onto the grating structure 22 according to comparison of singles generated by the first detecting module 16 and the second detecting module 18. The plurality of target image data can be used to establish an interlaced image datum, and the stereoscopic image printing device 10 can include more than two detecting modules according to design demand of the interlaced image datum, so as to combine the plurality of target image data for manufacturing an integrated image.

The first detecting module 16 includes a plurality of first shelters 24, a first planar light source 26, a first photosensitive component 28 and a first condenser 30. The plurality of first shelters 24 is disposed on a side of the grating structure 22. The first planar light source 26 is disposed on the other side of the grating structure 22 for emitting light to pass through the grating structure 22 and intervals between the adjacent first shelters 24. The first photosensitive component 28 is disposed on the side of the grating structure 22, which means the first photosensitive component 28 is on the same side of the grating structure 22 with the plurality of first shelters 24, for receiving the light emitted from the first planar light source 26 and passing through the grating structure 22 and the intervals between the adjacent first shelters 24, so as to generate a corresponding first optical intensity signal. The first photosensitive component 28 can be a single point photosensitive component, such as a photodiode or a photoresistor, and the optical intensity signal generated by the single point photosensitive component substantially can conform to a sine wave signal. In addition, the first condenser 30 can be disposed between the plurality of first shelters 24 and the first photosensitive component 28 for collecting the light emitted from the first planar light source 26, so as to prevent the first photosensitive component 28 from being interfered by external noise.

The second detecting module 18 includes a plurality of second shelters 32, a second planar light source 34, a second photosensitive component 36 and a corresponding condenser. Disposal and functions of components of the second detecting module 18 (the second shelter 32, the second planar light source 34, the second photosensitive component 36 and the corresponding condenser) are the same as disposal and functions of components of the first detecting module 16 (the first shelter 24, the first planar light source 26, the first photosensitive component 28 and the first condenser 30), and detailed description is omitted herein for simplicity. The first planar light source 26 and the second planar light source 34 can be even light plates, backlight modules and so on. It should be mentioned that the first detecting module 16 can be disposed adjacent to the second detecting module 18 as the plurality of first shelters 24 and the plurality of second shelters 32 are arranged in an interlaced manner, and a moving direction of the grating structure 22 can be substantially perpendicular to arrangements of the plurality of first shelters 24 and the plurality of second shelters 32 (indicated as an arrow shown in FIG.), so that the first photosensitive component 28 and the second photosensitive component 36 can respectively generate the first optical intensity signal and the second optical intensity signal when the grating structure 22 moves relative to the plurality of first shelters 24 and the plurality of second shelters 32.

Figure 2:
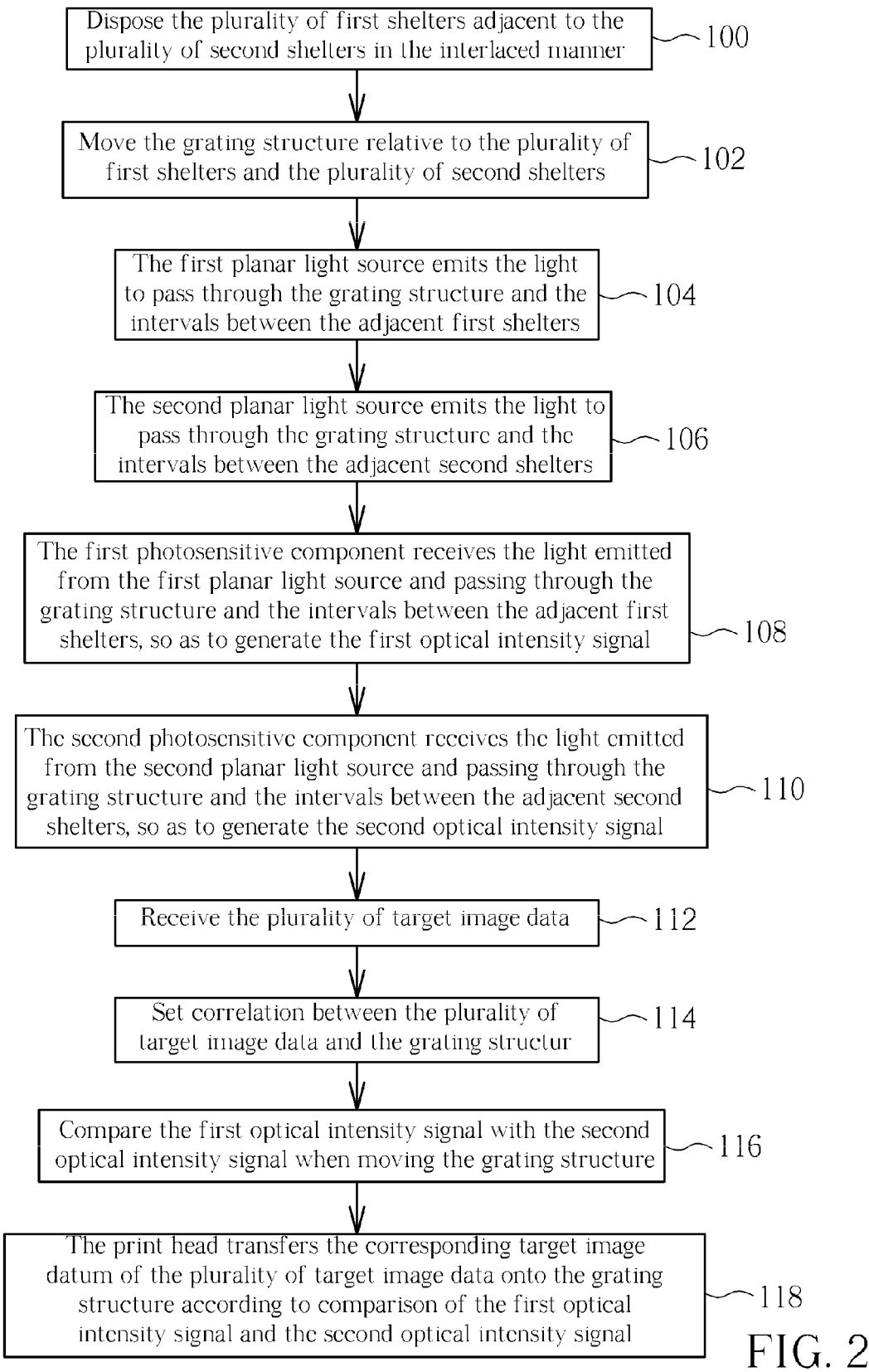
FIG. 2 is a flow chart of a stereoscopic image printing method according to the embodiment of the present invention.

Please refer to FIG. 2. FIG. 2 is a flow chart of a stereoscopic image printing method according to the embodiment of the present invention. The method includes following steps:

Step 100: Dispose the plurality of first shelters 24 adjacent to the plurality of second shelters 32 in the interlaced manner, and dispose the plurality of first shelters 24 and the plurality of second shelters 32 on the side of the grating structure 22.

Step 102: Move the grating structure 22 relative to the plurality of first shelters 24 and the plurality of second shelters 32.

Step 104: The first planar light source 26 emits the light to pass through the grating structure 22 and the intervals between the adjacent first shelters 24.

Step 106: The second planar light source 34 emits the light to pass through the grating structure 22 and the intervals between the adjacent second shelters 32.

Step 108: The first photosensitive component 28 receives the light emitted from the first planar light source 26 and passing through the grating structure 22 and the intervals between the adjacent first shelters 24, so as to generate the first optical intensity signal.

Step 110: The second photosensitive component 36 receives the light emitted from the second planar light source 34 and passing through the grating structure 22 and the intervals between the adjacent second shelters 32, so as to generate the second optical intensity signal.

Step 112: Receive the plurality of target image data.

Step 114: Set correlation between the plurality of target image data and the grating structure 22.

Step 116: Compare the first optical intensity signal with the second optical intensity signal when moving the grating structure 22.

Step 118: The print head 14 transfers the corresponding target image datum of the plurality of target image data onto the grating structure 22 according to comparison of the first optical intensity signal and the second optical intensity signal.

Figure 3:
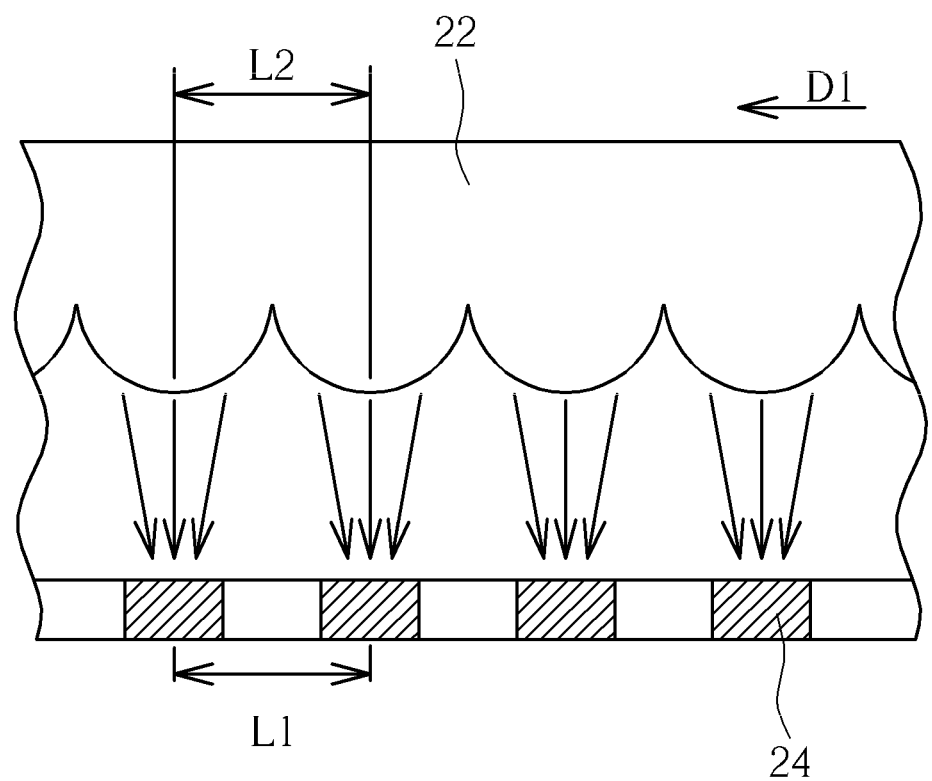
FIG. 3 and FIG. 4 are diagrams of a grating structure and shelters in different relative positions according to the embodiment of the present invention.
Figure 4:
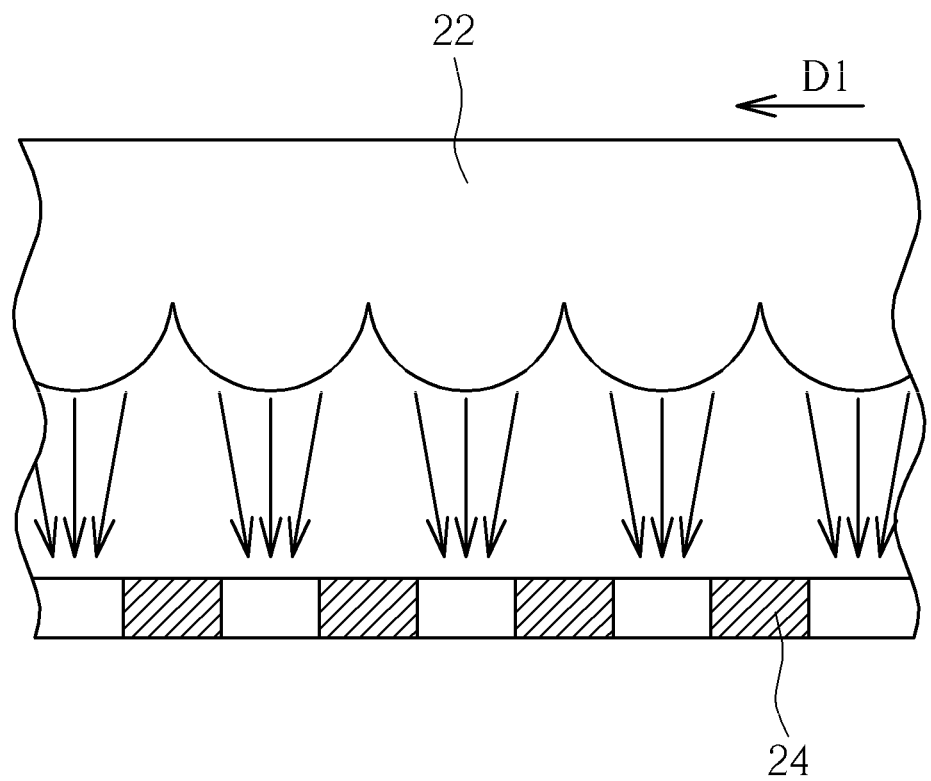

The method is introduced in detail as follows. First, the first detecting module 16 and the second detecting module 18 are disposed on the side of the grating structure 22. Please refer to FIG. 1, FIG. 3 and FIG. 4. FIG. 3 and FIG. 4 are diagrams of the grating structure 22 and the first shelters 24 (or the second shelters 32) in different relative positions according to the embodiment of the present invention. The first shelters 24 block the partial light emitted from the first planar light source 26, so that the first photosensitive component 28 can receive the optical intensity signal having amplitude variation with penetration of the unblocked light. Therefore, a width of each first shelter 24 is substantially smaller than a grating width of the grating structure 22. For example, as shown in FIG. 3, the distance of the adjacent first shelters 24 L1 can be equal to the distance of the adjacent grating is L2, so that the first photosensitive component 28 can receive the light emitted from the first planar light source 26 and passing through the grating structure 22 and the intervals between the adjacent first shelters 24. Due to condensation function of the grating structure 22, the plurality of first shelters 24 blocks most of the light passing through the grating structure 22 when the grating structure 22 moves relative to the first shelters 24 to a position as shown in FIG. 3, so that the first photosensitive component 28 generates the optical intensity signal having small amplitude as receiving the weak light emitted from the first planar light source 26 and passing through the grating structure 22 and the intervals between the adjacent first shelters 24.

When the grating structure 22 moves relative to the first shelters 24 to a position as shown in FIG. 4, the plurality of first shelters 24 does not block the light passing the grating structure 22, so the first photosensitive component 28 generates the optical intensity signal having great amplitude as receiving the strong light emitted from the first planar light source 26 and passing through the grating structure 22 and the intervals between the adjacent first shelters 24. Thus, the first photosensitive component 28 can generate the corresponding first optical intensity signal according to illumination variation when the grating structure 22 moves relative to the plurality of first shelters 24. For example, the first optical intensity signal can substantially conform to the sine wave signal. Method of generating the second optical intensity signal by the second detecting module 18 is the same as above-mentioned one, and detailed description is omitted herein for simplicity.

As shown in FIG. 1, the plurality of first shelters 24 of the first detecting module 16 and the plurality of second shelters 32 of the second detecting module 18 are arranged adjacently in an interlaced manner. The first planar light source 26 emits the light to pass through the grating structure 22 and the intervals between the adjacent first shelters 24, the second planar light source 34 emits the light to pass through the grating structure 22 and the intervals between the adjacent second shelters 32, and the grating structure 22 moves relative to the plurality of first shelters 24 and the plurality of second shelters 32 along a direction substantially perpendicular to arrangements of the plurality of first shelters 24 and the plurality of second shelters 32 (indicated as an arrow D1 shown in FIG.), so that there is phase difference between the first optical intensity signal generated by the first photosensitive component 28 and the second optical intensity signal generated by the second photosensitive component 36.

Figure 5:
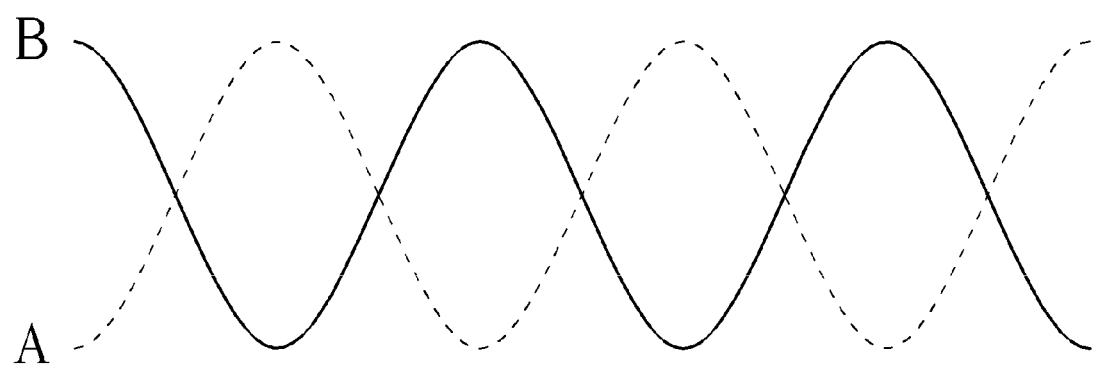
FIG. 5 is a diagram of optical intensity signals of a first photosensitive component and a second photosensitive component according to the embodiment of the present invention.

Please refer to FIG. 5. FIG. 5 is a diagram of the optical intensity signals of the first photosensitive component 28 and the second photosensitive component 36 according to the embodiment of the present invention. For example, the stereoscopic image printing device 10 including two detecting modules can print a 3D image or an image composed of two patterns, and phase difference of the optical intensity signals generated by the two detecting modules (for example, curve A is the first optical intensity signal, and curve B is the second optical intensity signal) can be 180 degrees, so that the controlling unit 20 can control the print head 14 to transfer the 3D image or the image composed of two patterns according to the phase difference of the first optical intensity signal and the second optical intensity signal. In addition, as the stereoscopic image printing device 10 includes three detecting modules, phase difference of the optical intensity signals generated by the three detecting modules can be 120 degrees, and the stereoscopic image printing device 10 having three detecting modules can print an integrated image combining with three interlaced patterns. Amount of the detecting modules and parameter of the phase difference is not limited to the above-mentioned embodiment, and it depends on design demand.

After, the controlling unit 20 receives the plurality of target image data and sets the correlation of the plurality of target image data and the grating structure 20. The controlling unit 20 compares the first optical intensity signal generated by the first photosensitive component 28 with the second optical intensity signal generated by the second photosensitive component 36 when the grating structure 22 moves relative to the plurality of first shelters 24 and the plurality of second shelters 32. For example, the controlling unit 20 can control the print head 14 to transfer a target image datum of two target image data onto the grating structure 22 when the first optical intensity signal is greater than the second optical intensity signal, and the controlling unit 20 can further control the print head 14 to transfer the other target image datum of the two target image data onto the grating structure 22 when the first optical intensity signal is smaller than the second optical intensity signal. Therefore, the print head 14 can transfer the plurality of target image data onto the corresponding positions of the grating structure 22 rapidly and accurately according to positioning information of the grating structure 22 detected by the two detecting modules, so as to enhance printing efficiency of the stereoscopic image. In the embodiment of the present invention, the first detecting module 16 and the second detecting module 18 can respectively generate the sine wave signals having amplitude variation according to relative position change between the grating structure 22, the first shelters 24 and the second shelters 32, so the controlling unit 16 can utilize the sine wave signals to determine moving parameters of the grating structure 22, such as the speed, the distance, the direction and so on. The stereoscopic image printing device 10 of the present invention can utilize the sine wave signal to be the positioning reference of the print head 14 when printing the stereoscopic image, so as to transfer the plurality of target image data onto the correct positions of the grating structure 22 rapidly.

Comparing to the prior art, the stereoscopic image printing device and the related printing method according to the embodiment of the present invention utilizes the single point photosensitive components to respectively receive the light emitted from the planar light sources and passing through the grating structure and the plurality of shelters, and the single point photosensitive components generate the optical intensity signals with sine wave when the grating structure moves relative to the plurality of shelters. The controlling unit of the stereoscopic image printing device of the present invention compares difference of the optical intensity signals for controlling the print head to transfer the corresponding target image data onto the corresponding position of the grating structure. Therefore, the positioning module of the present invention has advantages of simple structure, small volume and low cost, and can analyze positioning information immediately and rapidly, so as to enhance the printing efficiency of the stereoscopic image.

Those skilled in the art will readily observe that numerous modifications and alterations of the device and method may be made while retaining the teachings of the invention.

What is claimed is:

1. A stereoscopic image printing device comprising:
    an actuating unit for moving a grating structure;
    a print head for transferring a plurality of target image data onto corresponding positions of the grating structure;
    a first detecting module comprising:
        a plurality of first shelters disposed on a side of the grating structure;
        a first planar light source disposed on the other side of the grating structure for emitting light to pass through the grating structure and an interval between the adjacent first shelters; and
        a first photosensitive component disposed on the side of the grating structure for receiving the light emitted from the first planar light source passing through the grating structure and the interval between the adjacent first shelters so as to generate a corresponding first optical intensity signal;
    a second detecting module comprising:
        a plurality of second shelters disposed on the side of the grating structure;
        a second planar light source disposed on the other side of the grating structure for emitting light to pass through the grating structure and an interval between the adjacent second shelters; and
        a second photosensitive component disposed on the side of the grating structure for receiving the light emitted from the second planar light source passing through the grating structure and the interval between the adjacent second shelters so as to generate a corresponding second optical intensity signal; and
    a controlling unit coupled to the print head, the first photosensitive component and the second photosensitive component for controlling the print head to transfer a corresponding target image datum of the plurality of target image data onto the grating structure according to comparison of the first optical intensity signal and the second optical intensity signal.

2. The stereoscopic image printing device of claim 1, wherein the controlling unit is further for controlling the print head to print a target image datum of two target image data when the first optical intensity signal is greater than the second optical intensity signal, and the controlling unit is further for controlling the print head to print the other target image datum of the two target image data when the first optical intensity signal is smaller than the second optical intensity signal.

3. The stereoscopic image printing device of claim 1, wherein the plurality of first shelters is arranged adjacent to the plurality of second shelters in an interlaced manner.

4. The stereoscopic image printing device of claim 1, wherein a moving direction of the grating structure is substantially perpendicular to orientations of the plurality of first shelters and the plurality of second shelters.

5. The stereoscopic image printing device of claim 1, wherein the first photosensitive component is a single point photosensitive component, and the optical intensity signal generated by the single point photosensitive component substantially conforms to a sine wave signal.

6. The stereoscopic image printing device of claim 1, wherein the first detecting module further comprises a first condenser disposed between the plurality of first shelters and the first photosensitive component.

7. The stereoscopic image printing device of claim 1, wherein a width of each first shelter is substantially smaller than a grating width of the grating structure.

8. The stereoscopic image printing device of claim 1, wherein a distance between the adjacent first shelters is substantially equal to a grating width of the grating structure.

9. A stereoscopic image printing method comprising:
    arranging a plurality of first shelters adjacent to a plurality of second shelters in an interlaced manner;
    disposing the plurality of first shelters and the plurality of second shelters on a side of a grating structure;
    moving the grating structure relative to the plurality of first shelters and the plurality of second shelters;
    a first planar light source emitting light to pass through the grating structure and an interval between the adjacent first shelters;
    a second planar light source emitting light to pass through the grating structure and an interval between the adjacent second shelters;
    a first photosensitive component receiving the light emitted from the first planar light source passing through the grating structure and the interval between the adjacent first shelters so as to generate a corresponding first optical intensity signal;
    a second photosensitive component receiving the light emitted from the second planar light source passing through the grating structure and the interval between the adjacent second shelters so as to generate a corresponding second optical intensity signal;
    receiving a plurality of target image data;
    comparing the first optical intensity signal with the second optical intensity signal when moving the grating structure; and
    transferring a corresponding target image datum of the plurality of target image data onto the grating structure according to comparison of the first optical intensity signal and the second optical intensity signal.

10. The stereoscopic image printing method of claim 9, wherein transferring the corresponding target image datum of the plurality of target image data onto the grating structure according to the comparison of the first optical intensity signal and the second optical intensity signal comprises:
    transferring a target image datum of two target image data onto the grating structure when the first optical intensity signal is greater than the second optical intensity signal, and transferring the other target image datum of the two target image data onto the grating structure when the first optical intensity signal is smaller than the second optical intensity signal.

11. The stereoscopic image printing method of claim 9, wherein moving the grating structure relative to the plurality of first shelters and the plurality of second shelters comprises:
   moving the grating structure relative to the plurality of first shelters and the plurality of second shelters along a direction substantially perpendicular to orientations of the plurality of first shelters and the plurality of second shelters.

12. The stereoscopic image printing method of claim 9, further comprising:
   setting correlation of the plurality of target image data and the grating structure.

* * * * *